United States Patent Office 3,130,199
Patented Apr. 21, 1964

3,130,199
METHANOTHIANAPHTHENE COMPOUNDS
Russell M. Bimber, Painesville, Henry Bluestone, University Heights, and Irving Rosen, Painesville, Ohio, assignors to Diamond Alkali Company, Cleveland, Ohio, a corporation of Delaware
No Drawing. Filed Feb. 11, 1960, Ser. No. 7,984
15 Claims. (Cl. 260—330.5)

The present invention relates to a novel class of biologically active compounds and to methods of making and using said compounds.

More specifically, the compounds of the present invention are pesticides having the generic Formula A:

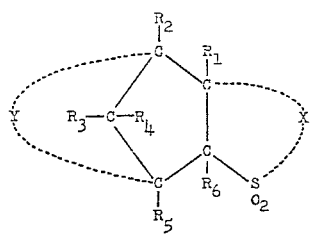

(A)

wherein X is a bivalent radical selected from the group consisting of

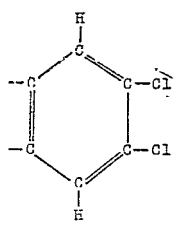 and 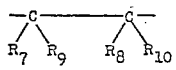

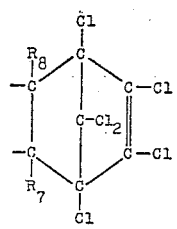

Y is a bivalent radical selected from the group consisting of

 and 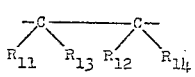

and $R_1$ through $R_{14}$ are selected from the group consisting of hydrogen atoms, halogen atoms, alkyl groups containing not more than six carbon atoms, and alkoxy groups, at least one of which is other than hydrogen.

It is to be understood that as used hereinafter, the term "pesticide" or "pesticidal composition" is meant to refer to those toxicant compositions which are effective in killing or controlling the growth of plants, insects, nematodes, microorganisms, fungi, bacteria and the like, and it is intended to refer broadly to those compositions commonly known as insecticides, bactericides, fungicides, nematocides, herbicides and the like.

Additionally, the term "halogen," as used hereinafter, is intended to refer broadly to fluorine, chlorine, bromine, and iodine. However, because of its low cost and ready availability, the preferred halogen in the compositions of the present invention is chlorine, and for this reason, primary reference hereinafter will be made thereto.

Exemplary of the compounds falling within the above designated generic formula are the following:

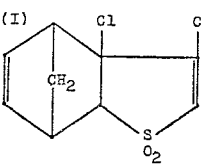 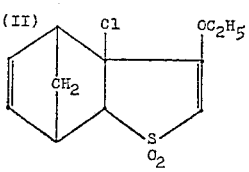

3,3a-dichloro-3a,4,7,7a-tetra-hydro-4,7-methanothia-naphthene 1,1-dioxide 3a-chloro-3-ethoxy-3a,4,7,7a-tetrahydro-4,7-methano-thianaphthene 1,1-dioxide

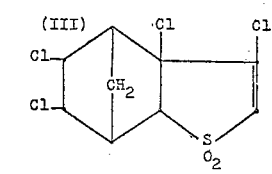

3,3a,5,6-tetrachloro-3a,4,5,6,7,7a-hexahydro-4,7-methanothianaphthene 1,1-dioxide 3-chloro-3a,4,7,7a-tetra-hydro-4,7-methanothia-naphthene 1,1-dioxide

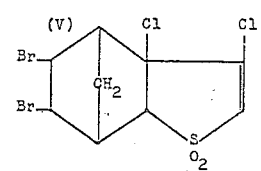

5,6-dibromo-3,3a-dichloro-3a,4,5,6,7,7a-hexahydro-4,7-methanothianaphthene 1,1-dioxide 3,4,5,6,7,8,8-heptachloro-2,3,3a,4,7,7a-hexahydro-4,7-methanothianaphthene 1,1-dioxide

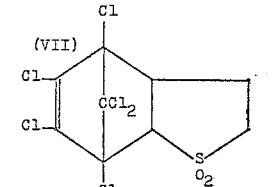

4,5,6,7,8,8-hexachloro-2,3,3a,4,7,7a-hexahydro-4,7-methanothianaphthene 1,1-dioxide 4,5,6,7,8,8-hexachloro-2,3,3a,4,7,7a-hexahydro-3-methoxy-4,7-methanothia-naphthene 1,1-dioxide

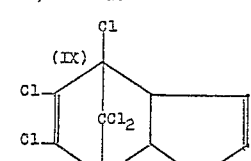

4,5,6,7,8,8-hexachloro-3a,4,7,7a-tetrahydro-4,7-methanothianaphthene 1,1-dioxide 2,2,3,3,3a,4,5,6,7,7a,8,8-do-decachloro-2,3,3a,4,7,7a-hexahydro-4,7-methano-thianaphthene 1,1-dioxide

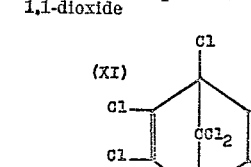

1,2,3,4,6,7,8,9,10,10,11,11 - dodecachloro - 1,4,4a,5a,6,9,9a,9b-octahydro-1,4,6,9-dimethanodibenzothiophene 5,5-dioxide

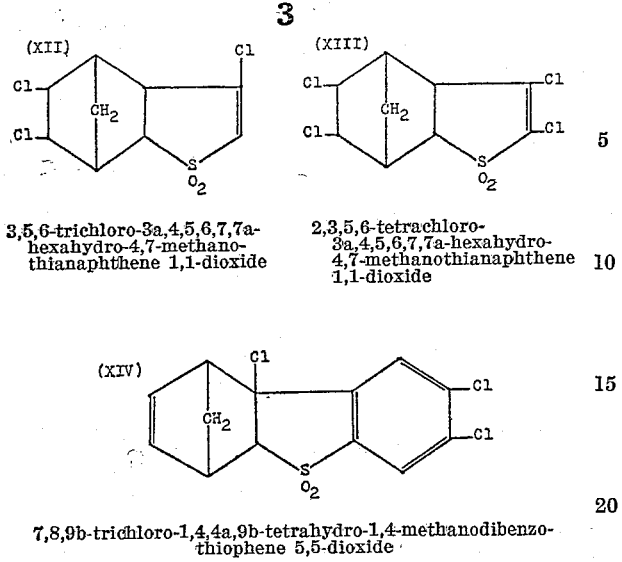

3,5,6-trichloro-3a,4,5,6,7,7a-
hexahydro-4,7-methano-
thianaphthene 1,1-dioxide 2,3,5,6-tetrachloro-
3a,4,5,6,7,7a-hexahydro-
4,7-methanothianaphthene
1,1-dioxide 7,8,9b-trichloro-1,4,4a,9b-tetrahydro-1,4-methanodibenzo-
thiophene 5,5-dioxide In addition, polymeric forms of the above olefinic compounds are also to be included in the generic formula. An example of such compounds is the following:

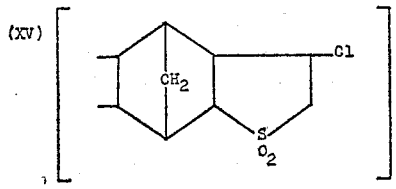

3-chloro-2,3,3a,4,7,7a-hexahydro-4,7-methanothianaphthene
1,1-dioxide and its polymers While compounds of the present invention may be employed in a variety of applications, biologically active or otherwise, it will be understood, of course, that such compounds may be utilized in diverse formulations, both liquid and solid, including finely-divided powders and granular materials, as well as liquids, e.g., solutions, emulsifiable concentrates, slurries and the like, depending upon the application intended and the formulation media desired.

Thus, it will be appreciated that compounds of this invention may be employed to form biologically active substances containing such compounds as essential active ingredients thereof, which compositions may also include finely-divided dry diluents, extenders, fillers and conditioners, such as various clays, diatomaceous earth, talc, spent catalyst, alumina-silica materials, and such liquid solvents, diluents, etc., as water, acetone, benzene, toluene, xylene and petroleum distillate fractions or mixtures thereof.

When liquid formulations are employed, or dry materials prepared which are to be used in liquid form, it may be desirable in certain instances, additionally to employ a wetting, emulsifying or dispersing agent to facilitate use of the formulation, e.g., Triton X–155 (alkyl aryl polyether alcohol, U.S. Patent 2,504,064).

In general, the compounds of the present invention may be produced by a Diels-Alder reaction between a cyclopentadiene and a dienophilic sulfone. The product thus-obtained may be isolated as one of the compounds of the present invention, or it may be subjected to further reaction, such as alkylation, halogenation, hydrogenation, etherification, dehydrohalogenation, and a Diels-Alder reaction with hexachlorocyclopentadiene to produce other compounds falling within the generic concept of the present invention.

More specifically, compounds having the generic Formula B:

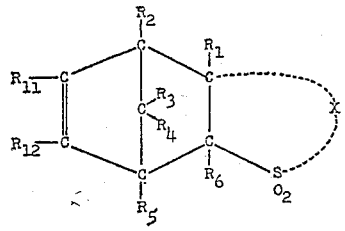

(B)

may be prepared by reacting a compound having the generic Formula C:

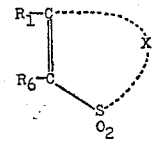

(C)

wherein X is a bivalent radical selected from the group consisting of

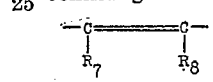 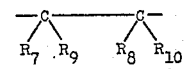

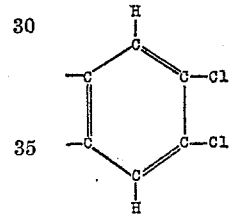 and 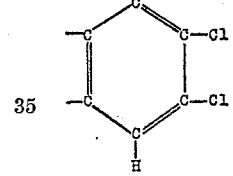

and $R_1$ through $R_{12}$ are selected from the group consisting of hydrogen atoms, halogen atoms and alkyl groups containing no more than six carbon atoms, with a cyclopentadiene in a Diels-Alder reaction. The product obtained is then separated as one of the compounds of the present invention or further reacted to produce other compounds of the present invention by alkylation, etherification, halogenation, dehydrohalogenation, or a Diels-Alder reaction with hexachlorocyclopentadiene to produce a compound falling within the generic Formula A given above. The reactions may be carried out in a solvent such as the various chlorinated lower aliphatic compounds, including methylene chloride, chloroform, carbon tetrachloride and the like. Moreover, in any additional reactions, a catalyst, such as ultraviolet light, may be used to enhance reaction. The compounds of the present invention, whether the product of the initial Diels-Alder reaction or the product of one of the further reaction steps, are generally purified by distillation or by crystallization from any appropriate solvent, such as heptane, benzene, xylene, ethyl acetate or methanol.

In order that those skilled in the art may better understand the present invention and the manner in which it may be practiced, the following specific examples are given. In these examples, the 3-chloro-2,3-dihydrothiophene 1,1-dioxide is prepared according to the method set forth in U.S. application Serial No. 606,972, now U.S. Patent No. 2,928,766, the 3,5,6-trichlorothianaphthene 1,1-dioxide is prepared according to the method set forth in a copending U.S. application, Ser. No. 7,983, filed on even date herewith, the 3,4-dichlorothiophene 1,1-dioxide is prepared according to the method set forth in U.S. application Serial No. 709,449, now U.S. Patent No. 2,976,297, and the 3,3,4,4-tetrachlorotetrahydrothiophene 1,1-dioxide referred to in this latter preparation is prepared according to the method set forth in U.S. application Serial No. 645,676, now U.S. Patent No. 2,957,887.

Moreover, the 3,3,4-trichlorotetrahydrothiophene-1,1-dioxide is prepared according to the following procedure: 400.0 g. (2.12 moles) of 3,4-dichlorotetrahydrothiophene-1,1-dioxide are dissolved in three liters of carbon tetrachloride at reflux temperature. The reaction mixture is illuminated by a 100 watt Hanovia #8A1 ultraviolet lamp in a quartz immersion well while 325.0 g. (4.6 moles) of chlorine are passed into the mixture over a period of 4.5 hours. Air is blown through the hot product suspension to remove hydrochloric acid and excess chlorine. The mixture is then cooled, filtered and the resulting solid washed with cold carbon tetrachloride. Recrystallizations from carbon tetrachloride and methanol gave pure 3,3,4-trichlorotetrahydrothiophene-1,1-dioxide, having a melting point of 110°–111° C.

EXAMPLE 1

*Preparation of 3,3a-Dichloro-3a,4,7,7a-Tetrahydro-4,7-Methanothianaphthene 1,1-Dioxide, (II)*

A solution of 185 g. (1.0 mole) of 3,4-dichlorothiophene 1,1-dioxide in 850 ml. acetone is stirred at a temperature below 5° C. while 101.8 g. (1.5 moles) of monomeric cyclopentadiene is added over a period of twenty-five minutes. The reaction is exothermic. Evaporating the acetone, triturating the partly crystalline residue with methanol, and filtering gives 153.7 g. (61%) purplish crude (I), M.P. 148°–151° C. One recrystallization from methanol, including a decolorizing carbon treatment, produces pure white (I), M.P. 150.5°–151.5° C., which gives the following analytical results:

| Element | Calculated, percent by Weight | Actual, percent by Weight |
| --- | --- | --- |
| C | 43.0 | 43.0 |
| H | 3.21 | 3.20 |
| Cl | 28.2 | 28.2 |

EXAMPLE 2

A tomato foliage disease test is conducted measuring the ability of the product of Example 1 to protect tomato foliage against infection by the early blight fungus *Alternaria solani*. Tomato plants 5 to 7 inches high of the variety Bonny Best are employed. The plants are sprayed with 100 ml. of test formulations containing 2000 p.p.m. and 400 p.p.m. of the product of Example 1—5% acetone—0.01% Triton X–155—balance water at 40 lbs. air pressure while being rotated on a turntable in a spray chamber. After the spray deposit is dry, the treated plants and comparable untreated controls are again sprayed as described above, with a spore suspension containing approximately 20,000 conidia of *A. solani* per ml. for 30 seconds at 20 lbs. The plants are held in a 100% humid atmosphere for 24 hours at 70° F. to permit spore germination and infection. One day after removal from the humid atmosphere, lesion counts are made on the three uppermost fully expanded leaves. Data based on the number of lesions obtained on the control plants shows that the product of Example 1 provides 96% and 83% disease control at 2000 and 400 p.p.m., respectively.

EXAMPLE 3

Tomato plants, variety Bonny Best, growing in 4 inch pots are treated by pouring a test formulation (2000 p.p.m. of the product of Example 1—5% acetone—0.01% Triton X–155—balance water) into the pots at an equivalent rate of 64 lbs./acre (51 mg./pot) and 16 lbs. acre (13 mg./pot). The tomato plants are 3 to 4 inches tall and the trifoliate leaves are just starting to unfold at time of treatment. The plants are exposed to powdery mildew continuously after seedling emergence so that at the time of treatment infection has occurred. After 10 to 14 days, observation indicates 89% and 71% disease control, at 64 lbs./acre and 16 lbs./acre, respectively, by comparison to the control plants.

EXAMPLE 4

The large seed leaves of 10-day old Pinto bean plants, four plants per 4 inch pot are used in this test. The product of Example 1 is applied to the soil in a test formulation (0.2% of the product of Example 1—5% acetone—0.01% Triton X–155—balance water). The concentration of test chemical used is equivalent to 128 lbs./acre. Immediately following application of the test chemical to the soil surrounding the plants, the plants are sprayed with a spore suspension of the rust fungus, *Uromyces phaseoli*. This spore suspension is prepared by taking 30 mg. of freshly harvested spores and mixing with 48 mg. of talc, then diluting with water at the rate of about 1 mg. of the talc spore mixture to 1.7 ml. of distilled water.

After spraying the spores on the seed leaves of the bean plants, they are placed in a water-saturated atmosphere for 24 hours at 60° F. After incubation, the plants are removed to controlled greenhouse conditions and 9 to 10 days after exposure rust lesions are counted. The data observed is converted to percentage disease control based on the number of lesions obtained on the control plants. Using this procedure, results indicate 71% disease control obtained.

EXAMPLE 5

*Preparation of 3a-Chloro-3-Ethoxy-3a-4,7,7a-Tetrahydro-4,7-Methanothianaphthene 1,1-Dioxide, (II)*

A solution of 15 g. (0.06 mole) of the product of Example 1 in 200 ml. absolute alcohol and 100 ml. acetone is stirred at room temperature while 5.2 g. (0.08 mole) 86% potassium hydroxide are added in portions. An hour later, the alkaline mixture is diluted with 500 ml. of water. After the mixture has stood at room temperature overnight it is diluted with an additional two liters of water and cooled. The crystals which form weigh 11.2 g. and melt at 100°–103° C. Recrystallizing from a mixture of 50 ml. ethanol and 400 ml. water produces 10.1 g. (65%) pure (II), M.P. 103°–104° C. Analytical data follows.

| Element | Calculated, percent by Weight | Actual, percent by Weight |
| --- | --- | --- |
| C | 50.7 | 50.5 |
| H | 5.03 | 5.06 |
| Cl | 13.6 | 12.4 |

EXAMPLE 6

Fungicidal utility is demonstrated by the ability of the product of Example 5 to protect tomato plants against the late blight fungus, *Phytophthora infestans*. The method employs tomato plants 5 to 7 inches high of the variety Bonny Best. 100 ml. portions of the test formulations (2000 p.p.m. and 400 p.p.m. of the product of Example 5—5% acetone—0.01% Triton X–155—balance water) are sprayed on the plants at 40 lbs. air pressure while the plants are being rotated on a turntable in a spray chamber. After the spray deposit is dry, the treated plants and comparable untreated controls are again sprayed as described above with a sporangial suspension containing approximately 150,000 sporangia of *P. infestans* per ml. for 30 seconds at 20 lbs. The plants are held in a water-saturated atmosphere for 24 hours at 60° F. to permit spore germination and infection. After 2 to 4 days, lesion counts are made on the three uppermost fully expanded leaves. Comparing the number of lesions on the test plants and control plants shows disease control of 94% and 70% at 2000 and 400 p.p.m., respectively.

EXAMPLE 7

Using the test procedure of Example 4, the systemic fungicidal action of the compound of Example 5 is tested.

The results obtained using a concentration of the compound of Example 5 equivalent to 128 lbs./acre show 87% disease control as compared to untreated control plants.

EXAMPLE 8

*Preparation of 3,3a,5,6-Tetrachloro-3a,4,5,6,7,7a-Hexahydro-4,7-Methanothianaphthene 1,1-Dioxide, (III)*

A solution of 30.1 g. (0.12 mole) of the product of Example 1 in 150 ml. of chloroform is stirred at room temperature while 43 g. (0.61 mole, 400% excess) of chlorine are added over a period of 5 hours. The chloroform is evaporated, leaving 42.4 g. (101%) crude (III). The crude product is rinsed with petroleum ether and then recrystallized from a mixture of 100 ml. benzene and 200 ml. cyclohexane, producing 26.1 g. (III) which melts at 165°–176° C. (cis and trans 5,6-dichloro isomers are presumed to be present) and has the following analysis:

| Element | Calculated, percent by Weight | Actual, percent by Weight |
|---|---|---|
| C | 33.6 | 33.4 |
| H | 2.50 | 2.49 |
| Cl | 44.0 | 43.2 |

EXAMPLE 9

Using the procedure of Example 2, the product of Example 8 is tested for its effectiveness against early tomato blight. The results obtained in percent disease control at various concentrations of the test chemical are as follows:

Concentration, p.p.m.:      Percent disease control
2000 ---- 100
400 ---- 100
256 ---- 100
128 ---- 100
64 ---- 100
32 ---- 99
16 ---- 60

EXAMPLE 10

Using the test procedure of Example 6, the compound of Example 8 is tested for effectiveness against the late blight fungi on tomato plants. The concentrations used and the results obtained are as follows:

Concentration, p.p.m.:      Percent disease control
2000 ---- 100
512 ---- 100
400 ---- 100
256 ---- 100
128 ---- 100
64 ---- 97
32 ---- 49

EXAMPLE 11

A test is carried out measuring the ability of the product of Example 8 to protect fabrics against cellulose-destroying fungi. Quadruplicate strips (1½" x 6"), of 8 oz. cotton duck, with the long dimension parallel to the warp, are treated by dipping them into solutions of the product of Example 8 in acetone. They are allowed to dry and then planted vertically in wooden boxes containing soil infested with fungi which destroy untreated strips in about 2 weeks when held at 80° F. At the end of the exposure period, the test specimens are removed from the soil bed and, if not completely degraded, gently washed to remove soil, air dried, and breaking strength determined. Using this procedure with the product of Example 8, the results obtained are as follows:

| Concentration | No. of Days | Tensile Strength, # |
|---|---|---|
| 1% | 14 | 87 |
| 1% | 24 | 73 |
| 0.5% | 14 | 74 |
| 0.25% | 14 | 55 |

EXAMPLE 12

Using the large seed leaves of 10-day old Pinto bean plants, a test formulation (0.2% of the product of Example 8—5% acetone—0.01% Triton X-155—balance water) is sprayed on the foliage of the plants, and allowed to dry. Thereafter, the plants are exposed to unredospores of the bean rust fungus, *Uromyces phaseoli*. The thus-exposed seed leaves of the bean plants are then placed in a water-saturated atmosphere for 24 hours at 60° F. After incubation the plants are removed to controlled greenhouse conditions and 9 to 10 days after exposure rust lesions are counted. The data observed is converted to percentage disease control based on the number of lesions obtained on the control plants. The concentrations of the product of Example 8 used and the results obtained are as follows:

Concentration, p.p.m.:      Percent rust control
256 ---- 99
128 ---- 99
64 ---- 97

EXAMPLE 13

A cucumber foliage disease test is conducted to measure the ability of the product of Example 8 to control anthracnose of cucumber incited by the fungus, *Colletotrichum lagenarium*. Cucumber plants, variety National Pickling, having one fully extended leaf, are sprayed with a test formulation of the product of Example 8 in combination with 5% acetone, 0.01% Triton X-155 and water, at 40 lbs. air pressure while being rotated on a turntable in a spray chamber. After the spray deposit is dried, the treated plants and comparable untreated controls are sprayed with a spore suspension containing approximately 400,000 conidia of *Colletotrichum legenarium* per ml. The plants are held in a 100% humid atmosphere for 24 hours at 70° F. to permit spore germination and infection. After 4 to 6 days necrotic lesions are counted and the percent disease control obtained, based on the number of lesions on the control plants, is calculated. The concentrations of the product of Example 8 used and the results obtained are as follows:

Concentration, p.p.m.:      Percent disease control
512 ---- 100
256 ---- 100
128 ---- 98
64 ---- 79

EXAMPLE 14

*Preparation of 5,6-Dibromo-3,3a-Dichloro-3a,4,5,6,7,7a-Hexahydro-4,7-Methanothianaphthene 1,1-Dioxide, (V)*

16.8 g. (0.067 mole) of the product of Example 1 is stirred in 200 ml. of carbon tetrachloride and 10.8 g. (0.067 mole) bromine are added. The appearance of the red mixture does not change noticeably upon being exposed to light from two 15 watt General Electric ultraviolet fluorescent lamps overnight at room temperature. The mixture is diluted with 160 ml. of chloroform and warmed briefly to 42° C. to dissolve all the solid. Illumination at room temperature is continued for another day and then the solvent is removed from the orange solution under vacuum. The 27.5 g. light orange crude (V) is recrystallized from 600 ml. of methanol, producing 20.3 g. (74%) pure (V) which melts at 158.0°–158.5° C. The analysis of the product is reported below.

| Element | Calculated, percent by Weight | Actual, percent by Weight |
|---|---|---|
| C | 26.3 | 26.4 |
| H | 1.96 | 1.93 |

EXAMPLE 15

The product of Example 14 is tested as a fungicide using the procedure of Example 2. The concentrations used and results obtained are as follows:

Concentration, p.p.m.:     Percent disease control
  128 ------------------------------- 99
  64 -------------------------------- 99
  32 -------------------------------- 85
  16 -------------------------------- 66

EXAMPLE 16

The product of Example 14 is tested as a fungicide using the procedure of Example 6. The concentrations used and results obtained are as follows:

Concentration, p.p.m.:     Percent disease control
  128 ------------------------------- 98
  64 -------------------------------- 81
  32 -------------------------------- 63

EXAMPLE 17

The product of Example 14 is tested using the procedure of Example 11. Using a concentration of 1.0%, at the end of 14 days, the treated test strip has a tensile strength of 45 lbs.

EXAMPLE 18

*Preparation of 3,4,5,6,7,8,8 - Heptachloro - 2,3,3a,4,7,7a- Hexahydro-4,7-Methanothia - Naphthene 1,1 - Dioxide, (VI)*

A mixture of 152.5 g. (1.0 mole) of 3-chloro-2,3-dihydrothiophene 1,1-dioxide and 272.7 g. (1.0 mole) of hexachlorocyclopentadiene are heated at 160°±10° C. for two weeks. The cooled black mixture is triturated in a mixture of equal volumes of methanol and petroleum ether, whereupon crystals are formed. Filtering and rinsing the solid on the filter with more of the solvent mixture leaves 285.1 g. (67%) of almost white product. One recrystallization from methanol produces 178.5 g. (42%) pure (VI), M.P. 153°–154° C., and 63.8 g. (total, 57%) of less pure (VI), M.P. 152°–153° C. Analysis gives the following results:

| Element | Calculated, percent by Weight | Actual, percent by Weight |
|---|---|---|
| C | 25.4 | 25.7 |
| H | 1.2 | 1.5 |
| Cl | 58.5 | 58.9 |

EXAMPLE 19

Male German cockroaches, *Blattella germanica*, 8 to 9 weeks old, are anaesthetized with carbon dioxide to facilitate handling and then dipped in a test formulation containing varying amounts of the product of Example 18, plus 5% acetone, 0.01% Triton X-155, balance water, for 10 seconds, removed, and freed of excess liquid and caged. Two lots of 10 insects each are exposed to this formulation and mortality observations are recorded after three days. The concentrations used and the results obtained are as follows:

Concentration, p.p.m.:     Percent mortality
  2000 ------------------------------ 100
  1000 ------------------------------ 100
  500 ------------------------------- 100
  250 ------------------------------- 100
  125 ------------------------------- 100

EXAMPLE 20

Tomato plants, variety Bonny Best, growing in 4 inch pots are treated by pouring a test formulation containing 2000 p.p.m. of the product of Example 18, 5% acetone, 0.01% Triton X-155 and the balance water, into the pots at an equivalent rate of 128 lbs./acre (102 mg./pot). The tomato plants are 3 to 4 inches tall and the trifoliate leaves are just starting to unfold at the time of treatment. The plants have been exposed to powdery mildew continuously after seedling emergence so that at the time of treatment infection has occurred. Observations made after 10 to 14 days indicate 72% disease control by comparison to the control plants.

EXAMPLE 21

*Preparation of 4,5,6,7,8,8-Hexachloro - 3a,4,7,7a - Tetrahydro-4,7-Methanothianaphthene 1,1-Dioxide, (IX)*

A solution of 29.6 g. (0.07 mole) of the product of Example 18 in 300 ml. of methanol and 150 ml. of acetone is stirred at room temperature while 4.7 ml. of 58% ammonium hydroxide diluted with 20 ml. of acetone are added over a half hour period. Stirring is continued for an hour at room temperature and for one more hour at reflux temperature. Evaporating most of the solvent, cooling, and filtering produces 28.7 g. (106%) crude (IX), M.P. 223°–227° C. Two recrystallizations from methanol, including a charcoal treatment, gives pure (IX), M.P. 232°–233° C., having the following analysis:

| Element | Calculated, percent by Weight | Actual, percent by Weight |
|---|---|---|
| C | 27.8 | 27.7 |
| H | 1.04 | 1.1 |

EXAMPLE 22

The product of Example 21 is tested as an insecticide using the procedure of Example 19. The concentrations used and the results obtained are as follows:

Concentration, p.p.m.:     Percent mortality
  2000 ------------------------------ 100
  1000 ------------------------------ 100
  256 ------------------------------- 95
  128 ------------------------------- 95

EXAMPLE 23

*Preparation of 1,2,3,4,6,7,8,9,10,10,11,11-Dodecachloro-1,4,4a,5a,6,9,9a,9b - Octahydro - 1,4,6,9 - Dimethanodibenzothiophene 5,5-Dioxide, (XI)*

A mixture of 27.3 g. (0.1 mole) of hexachlorocyclopentadiene and 10.7 g. (0.0275 mole) of the product of Example 21 is heated at 160°±10° C. for two weeks. The resulting black mixture partially crystallized on cooling; triturating with 25 ml. of a mixture of equal volumes of petroleum ether and isopropanol, filtering, and washing with more of the same solvent mixture leaves 7 g. (38%) crude light brown (XI). After several recrystallizations from isopropanol, including a charcoal treatment, 3.7 g. (20%) pure (XI), M.P. 262°–263° C., are obtained. Its analysis follows.

| Element | Calculated, percent by Weight | Actual, percent by Weight |
|---|---|---|
| C | 25.4 | 25.3 |
| H | 0.61 | 0.8 |
| Cl | 64.3 | 64.1 |

EXAMPLE 24

The product of Example 23 is tested using the procedure of Example 4. Using this procedure the results indicate 77% disease control as compared to the nontreated control plants.

EXAMPLE 25

*Preparation of 4,5,6,7,8,8-Hexachloro-2,3,3a,4,7,7a-Hexahydro-4,7-Methanothianaphthene 1,1-Dioxide, (VII)*

A mixture of 47 g. (0.25 mole) of alpha-butadiene sulfone and 120 g. (0.44 mole) of hexachlorocyclopentadiene are heated at 150°–160° C. for two weeks. The crystals which form on cooling to room temperature are recrystallized twice from methanol including a decolorizing carbon treatment, yielding 68.6 g. (70%) pure (VII), M.P. 273°–274° C., having the following analysis:

| Element | Calculated, percent by Weight | Actual, percent by Weight |
|---|---|---|
| C | 27.7 | 27.9 |
| H | 1.55 | 1.9 |

EXAMPLE 26

The product of Example 25 is tested using the procedure of Example 19. The concentrations used and the results obtained are as follows:

| Concentration, p.p.m.: | Percent mortality |
|---|---|
| 2000 | 100 |
| 1000 | 100 |
| 500 | 70 |

EXAMPLE 27

Fourth instar larvae of the Mexican bean beetle, *Epilachna varivestis*, less than one day old within the instar, are employed. Paired seed leaves, excised from Tendergreen bean plants, are dipped in a formulation of the test compound (2000 p.p.m. product of Example 25—5% acetone—0.01% Triton X-155—balance water) until they are thoroughly wetted. The chemical deposit on the leaf is then dried and the paired leaves are separated. Each is placed in a 9 cm. Petri dish with a filter paper liner, and ten randomly selected larvae are introduced before the dish is closed. After three days exposure, 85% mortality is observed. Additionally, it is noted that a greater than 50% feeding inhibition of the bean beetles is caused by this compound.

EXAMPLE 28

*Preparation of 2,2,3,3,3a,4,5,6,7,7a,8,8-Dodecachloro-2,3,3a,4,7,7a-Hexahydro-4,7-Methanothianaphthene 1,1-Dioxide, (X)*

A solution of 7.8 g. (0.02 mole) of the product of Example 25 in 50 ml. of chloroform and 100 ml. of carbon tetrachloride are heated at reflux and illuminated with an ultraviolet lamp in a quartz immersion well for seven hours while 50 g. (0.7 mole) of chlorine are added. Evaporating the solvent leaves 12.7 g. of viscous liquid. Triturating with methanol causes a small amount of crystalline solid to separate; this is filtered off. The filtrate is heated in a 70° C. water bath at about 0.1 mm. pressure for three hours to remove the solvent. The resulting viscous liquid begins to crystallize extremely slowly, so xylene is added, giving a liquid that is 24.2% xylene for analysis. The following analysis has been corrected to allow for the xylene.

| Element | Calculated, percent by Weight | Actual, percent by Weight |
|---|---|---|
| C | 18.1 | 17.6 |
| H | None | 0.8 |
| Cl | 71.3 | 70.6 |

EXAMPLE 29

The product of Example 28 is tested using the procedure of Example 2. The concentrations used and the results obtained are as follows:

| Concentration, p.p.m.: | Percent disease control |
|---|---|
| 512 | 100 |
| 256 | 98 |
| 128 | 86 |
| 64 | 51 |

EXAMPLE 30

The product of Example 28 is tested using the procedure of Example 6. The concentrations used and results obtained are as follows:

| Concentration, p.p.m.: | Percent disease control |
|---|---|
| 512 | 91 |
| 256 | 89 |

EXAMPLE 31

The product of Example 28 is tested using the procedure of Example 19. The concentrations used and the results obtained are as follows:

| Concentrations, p.p.m.: | Percent mortality |
|---|---|
| 2000 | 100 |
| 1000 | 100 |
| 500 | 100 |
| 256 | 70 |
| 128 | 70 |
| 64 | 50 |

EXAMPLE 32

*Preparation of 3-Chloro-2,3,3a,4,7,7a-Hexahydro-4,7-Methanothianaphthene 1,1-Dioxide and Polymers Thereof, (XV)*

A solution of 66 g. (0.5 mole) of cyclopentadiene dimer and 76.5 g. (0.5 mole) of 3-chloro-2,3-dihydrothiophene 1,1-dioxide in 450 ml. xylene are heated at reflux temperature for eighteen hours and then distilled. The fraction which distills between 146° C. at 0.7 mm. and 162° C. at 0.8 mm. pressure crystallizes when triturated in a mixture of equal volumes of methanol and petroleum ether. This solid is recrystallized several times from methanol, including a decolorizing charcoal treatment, producing 36.8 g. (44%) of $(C_9H_{11}ClO_2S)_n$ as a white crystalline solid which has a M.P. of 113.5°–116.0° C. The product from a similar reaction melts at 112°–129° C. after recrystallization. Analyses show both products to be low polymers of the anticipated material.

| Element | Calculated, percent by Weight for $(C_9H_{11}ClO_2S)_n$ | Actual, percent by Weight for Product of M.P. 113.5°–116.0° C. | Actual, percent by Weight for Product of M.P. 112°–129° C. |
|---|---|---|---|
| C | 49.45 | 49.6 | 49.1 |
| H | 5.07 | 5.5 | 4.9 |
| Cl | 16.2 | 15.8 | 17.4 |
| S | 14.66 | | 14.7 |

The infrared spectra shows that no double bonds are present in ether product, thus confirming that the products are polymeric. Molecular weight determinations on the material which melts at 113.5°–116° C. give values of 763, 1010, and 1160, indicating the average value of $n$ is about five. The product melting at 112°–129° C. gives experimental molecular weights of 654 and 659, indicating that the average value of $n$ is three in this case.

The structure of these products may be represented as

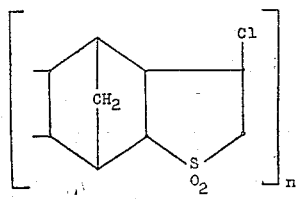

wherein $n=$ an integer from 1 to 6, inclusive.

EXAMPLE 33

The product of Example 32 is tested using the procedure of Example 19. At a concentration of 2000 p.p.m., 100% mortality of the roaches is obtained.

EXAMPLE 34

To evaluate the effect of the product of Example 32 upon the germination of seeds in soil, a mixture of seed of six crop plants is broadcast in 8 x 8 x 2 inch metal pans filled to within one-half inch of the top with composted greenhouse soil. The seed is uniformly covered with about one-quarter inch of soil and watered. After 24 hours, 80 ml. of an aqueous test formulation (160 mg. of the compound of Example 32—5% acetone—0.01% Triton X-155—balance water) at 10 lbs. air pressure is sprayed uniformly over the surface of the pan. This is equivalent to a concentration of the test chemical of 32 lbs./acre. The seed mixture contains representatives of three broadleafs: turnip, flax and alfalfa, and three grasses: wheat, millet and rye grass. Two weeks after treatment records are taken on seedling stand as compared with the controls. Using this procedure, the results show 80% control of broadleaved plants and 80% control of grasses.

EXAMPLE 35

Phytotoxicity is evaluated by using tomato plants, variety Bonny Best, growing in 4 inch pots. The plants are treated by applying the product of Example 32 to the soil of the pot at a concentration equivalent to 128 lbs./acre. After 10 days, phytotoxicity is rated on a scale from 0 for no injury to 11 for plant kill. Using this procedure, the product of Example 32 receives a rating of 11 for tomato.

EXAMPLE 36

The product of Example 32 is tested using the procedure of Example 4; at a concentration of 64 lbs./acre, 70% disease control is obtained.

EXAMPLE 37

*Preparation of 4,5,6,7,8,8-Hexachloro-2,3,3a,4,7,7a-Hexahydro-3-Methoxy-4,7-Methanothianaphthene 1,1-Dioxide, (VIII)*

A solution of 10.4 g. (0.024 mole) of the product of Example 18 in 300 ml. of methanol is stirred and cooled below 30° C. while 1.33 g. (0.013 mole) anhydrous sodium carbonate are added. The mixture is stirred at reflux temperature for twenty hours and then concentrated to a volume of about 75 ml. by distilling off methanol. Adding 75 ml. warm water and cooling produces 9.1 g. (90%) crude (VIII), M.P. 188°–194° C. Two recrystallizations from methanol give pure (VIII), M.P. 193.5°–194.0° C., having the following analysis:

| Element | Calculated, percent by Weight | Actual, percent by Weight |
|---|---|---|
| C | 28.6 | 28.9 |
| H | 1.92 | 3.2 |
| Cl | 50.5 | 50.5 |

EXAMPLE 38

*Preparation of 3-Chloro-3a,4,7,7a-Tetrahydro-4,7-Methanothianaphthene 1,1-Dioxide, (IV)*

A solution of 33.6 g. (0.15 mole) of 3,3,4-trichlorotetrahydrothiophene 1,1-dioxide and 19.8 g. (0.3 mole, 100% excess) of monomeric cyclopentadiene in 375 ml. of methanol is stirred and cooled below 15° C. while anhydrous ammonia is added until the solution remains alkaline. The addition of ammonia takes an hour and ten minutes. The mixture is heated at reflux temperature for ½ hour and subsequently evaporated to dryness. The solid residue is extracted with 250 ml. of warm chloroform and 30.6 g. (79%) crude (IV) is obtained by evaporating the chloroform. One recrystallization of this from methanol produces 26.4 g. (68%) pure (IV), M.P. 124°–125° C., which has the following analysis:

| Element | Calculated, percent by Weight | Actual, percent by Weight |
|---|---|---|
| C | 49.9 | 49.9 |
| H | 4.18 | 4.3 |
| Cl | 16.4 | 15.9 |
| Molecular wgt | 217 | 235 |

EXAMPLE 39

*Preparation of 2,3,5,6-Tetrachloro-3a,4,5,6,7,7a-Hexahydro-4,7-Methanothianaphthene 1,1-Dioxide, (XIII)*

A solution of 59.9 g. (0.276 mole) of the product of Example 38 in 400 ml. of chloroform is stirred and cooled to keep the temperature below 32° C. while 73 g. (1.03 mole) of chlorine are bubbled into the solution during 3½ hours. Air is drawn through the solution to remove excess chlorine and the chloroform is evaporated, leaving a sticky white solid. The stickiness is removed by rinsing with warm heptane and the solid is recrystallized from methanol, giving several portions of solid. The first few portions of solid which separated from the methanol are combined and recrystallized several times from mixtures of benzene and heptane, producing 13.4 g. of powdery white solid, M.P. 205°–206° C. The infrared spectrum of this material did not contain an absorption peak corresponding to the presence of an ethylenic hydrogen atom. This fact, coupled with the method of preparation and the following analytical data, shows this product to be (XIII).

| Element | Calculated, percent by Weight | Actual, percent by Weight |
|---|---|---|
| C | 33.6 | 33.9 |
| H | 2.5 | 2.7 |
| Cl | 44.0 | 44.0 |
| S | 9.96 | 9.5 |

EXAMPLE 40

*Preparation of 3,5,6-Trichloro-3a,4,5,6,7,7a-Hexahydro-4,7-Methanothianaphthene 1,1-Dioxide, (XII)*

This material is obtained as a byproduct from the reaction described in Example 39. The latter portions of solid obtained by recrystallizing the crude product from methanol are combined and recrystallized several times from mixtures of benzene and heptane. A final recrystallization from heptane produces fine needle-shaped colorless crystals, M.P. 151°–156° C. Elemental and infrared analysis shows this to be approximately 80% (XII); the balance is the product of Example 39, (XIII).

| Element | Calculated, percent by Weight for 80% (XII) and 20% (XIII) | Actual, percent by Weight |
|---|---|---|
| C | 36.8 | 36.8 |
| H | 3.0 | 3.0 |
| Cl | 38.4 | 39.2 |
| S | 10.9 | 10.8 |

EXAMPLE 41

*Preparation of 7,8,9b-Trichloro-1,4,4a,9b-Tetrahydro-1,4-Methanodibenzothiophene 5,5-Dioxide, (XIV)*

A solution of 27 g. (0.1 mole) of 3,5,6-trichlorothianaphthene 1,1-dioxide in 275 ml. of chloroform is stirred at a temperature below 30° C. while 10 g. (0.15 mole) of cyclopentadiene are added. The mixture is heated slowly and held at reflux for ninety minutes, then most of the solvent is distilled off. Cooling and filtering yields 8.1 g. unreacted trichlorothianaphthene dioxide, M.P. 168°–171° C. Evaporating the filtrate to dryness, triturating the residue with petroleum ether, filtering, and rinsing with isopropanol leaves 19.6 g. of solid. Several recrystallizations of the solid from benzene and from methanol yield 9.3 g. pure (XIV), M.P. 151.5°–152.5° C., having the following analysis:

| Element | Calculated, percent by Weight | Actual, percent by Weight |
|---|---|---|
| C | 46.6 | 46.6 |
| H | 2.70 | 2.7 |
| Cl | 31.7 | 31.4 |

EXAMPLE 42

Using the procedure of Example 19, the product of Example 41 is tested to determine its effectiveness as a roachicide. At a concentration of 2000 p.p.m., the product of Example 41 kills 100% of the roaches.

EXAMPLE 43

The product of Example 41 is tested for its effectiveness as a selective pre-emergent herbicide. Using the procedure of Example 34, at a concentration of 32 lbs./acre, the product of Example 41 gives 80% control of grasses and 10% control of broadleaved plants.

EXAMPLE 44

The product of Example 38 is tested for its effectiveness as a roachicide. Using the procedure of Example 19, at a concentration of 2000 p.p.m., the product of Example 38 kills 100% of the roaches.

EXAMPLE 45

The product of Example 38 is tested for its effectiveness as an herbicide. Using the procedure of Example 35, at a concentration of 128 lbs./acre, the product of Example 38 receives a rating of 11.

It is to be understood that although the invention has been described with specific reference to particular embodiments thereof, it is not to be so limited, since changes and alterations therein may be made which are within the full intended scope of this invention as defined by the appended claims.

What is claimed is:
1. 3,3a - dichloro - 3a,4,7,7a - tetrahydro - 4,7 - methanothianaphthene 1,1-dioxide.
2. 3a - chloro - 3 - ethoxy - 3a,4,7,7a - tetrahydro - 4,7-methanothianaphthene 1,1-dioxide.
3. 3,3a,5,6 - tetrachloro - 3a,4,5,6,7,7a - hexahydro-4,7-methanothianaphthene 1,1-dioxide.
4. 3 - chloro - 3a,4,7,7a - tetrahydro - 4,7 - methanothianaphthene 1,1-dioxide.
5. 5,6 - dibromo - 3,3a - dichloro - 3a,4,5,6,7,7a - hexahydro-4,7-methanothianaphthene 1,1-dioxide.
6. 3,4,5,6,7,8,8 - heptachloro - 2,3,3a,4,7,7a - hexahydro-4,7-methanothianaphthene 1,1-dioxide.
7. 4,5,6,7,8,8 - hexachloro - 2,3,3a,4,7,7a - hexahydro-4,7-methanothianaphthene 1,1-dioxide.
8. 4,5,6,7,8,8 - hexachloro - 2,3,3a,4,7,7a - hexahydro-3-methoxy-4,7-methanothianaphthene 1,1-dioxide.
9. 4,5,6,7,8,8 - hexachloro - 3a,4,7,7a - tetrahydro-4,7-methanothianaphthene 1,1-dioxide.
10. 1,2,3,4,6,7,8,9,10,10,11,11-dodecachloro-1,4,4a,5a,6,9,9a,9b - octahydro - 1,4,6,9 - dimethanodibenzothiophene-5,5-dioxide.
11. 3 - chloro - 2,3,3a,4,7,7a - hexahydro - 4,7 - methanothianaphthene 1,1-dioxide.
12. Polymers of 3-chloro-2,3,3a,4,7,7a-hexahydro-4,7-methanothianaphthene 1,1-dioxide having the structure

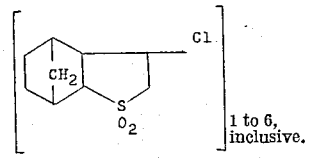

13. 2,3,5,6 - tetrachloro - 3a,4,5,6,7,7a - hexahydro-4,7-methanothianaphthene 1,1-dioxide.
14. 3,5,6 - trichloro - 3a,4,5,6,7,7a - hexahydro - 4,7-methanothianaphthene 1,1-dioxide.
15. 7,8,9b - trichloro - 1,4,4a,9b - tetrahydro - 1,4-methanodibenzothiophene 5,5-dioxide.

References Cited in the file of this patent
UNITED STATES PATENTS

| | | |
|---|---|---|
| 2,610,192 | Mahan et al. | Sept. 9, 1952 |
| 2,634,200 | Schlesinger | Apr. 7, 1953 |
| 2,634,201 | Mowry et al. | Apr. 7, 1953 |
| 2,664,426 | Elmer | Dec. 29, 1953 |
| 2,682,545 | Mahan et al. | June 29, 1954 |
| 2,691,616 | Dickey et al. | Oct. 12, 1954 |
| 2,758,955 | Johnson et al. | Aug. 14, 1956 |
| 2,786,851 | Mahan | Mar. 26, 1957 |
| 2,930,800 | Kloetzel | Mar. 29, 1960 |

OTHER REFERENCES

Alder et al.: Berichte, vol. 71, pp. 2451–61 (1938).
Hartough: Thiophene and Derivatives, 1952, page 177.
Hartough: Condensed Thiophenes, Interscience Publishers, Inc., New York, N.Y., 1954, pp. 161–62.
Birch et al.: Jour. Organic Chem., vol. 21, pp. 970–4 (1956).
Davies et al.: Jour. Chem. Soc. (London), 1957, pp. 459–63.
Fieser et al.: Organic Chemistry, 3rd ed., 1958, page 136.

UNITED STATES PATENT OFFICE
CERTIFICATE OF CORRECTION

Patent No. 3,130,199

April 21, 1964

Russell M. Bimber et al.

It is hereby certified that error appears in the above numbered patent requiring correction and that the said Letters Patent should read as corrected below.

Column 3, lines 28 to 35, the structure should appear as shown below instead of as in the patent:

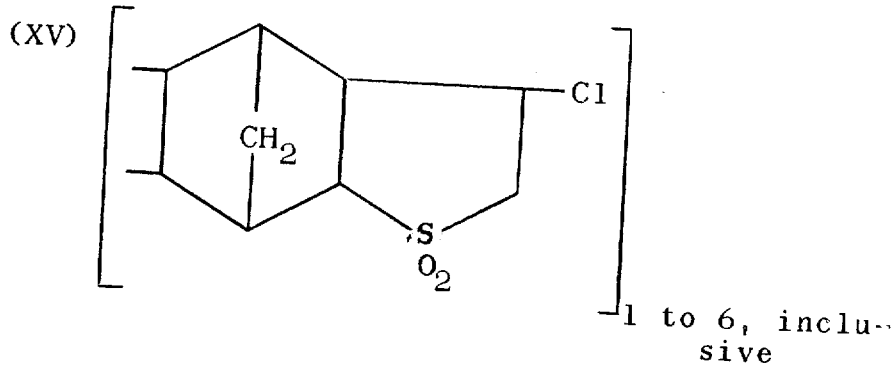

column 5, line 19, for "(II)" read -- (I) --; line 67, for "16 lbs." read -- 16 lbs./ --.

Signed and sealed this 22nd day of September 1964.

(SEAL)
Attest:

ERNEST W. SWIDER
Attesting Officer

EDWARD J. BRENNER
Commissioner of Patents